US012062496B2

(12) United States Patent
Ogawa et al.

(10) Patent No.: US 12,062,496 B2
(45) Date of Patent: Aug. 13, 2024

(54) CAPACITOR

(71) Applicants: DENSO CORPORATION, Kariya (JP); NICHICON CORPORATION, Kyoto (JP)

(72) Inventors: Yuuki Ogawa, Kariya (JP); Hiroaki Imi, Kyoto (JP); Yasuyuki Murakami, Kyoto (JP)

(73) Assignees: DENSO CORPORATION, Kariya (JP); NICHICON CORPORATION, Kyoto (JP)

( * ) Notice: Subject to any disclaimer, the term of this patent is extended or adjusted under 35 U.S.C. 154(b) by 257 days.

(21) Appl. No.: 17/712,357

(22) Filed: Apr. 4, 2022

(65) Prior Publication Data

US 2022/0230808 A1 Jul. 21, 2022

Related U.S. Application Data

(63) Continuation of application No. PCT/JP2020/036174, filed on Sep. 25, 2020.

(30) Foreign Application Priority Data

Oct. 2, 2019 (JP) ................. 2019-181860

(51) Int. Cl.
*H01G 4/228* (2006.01)
*H01G 4/005* (2006.01)
*H01G 4/224* (2006.01)
*H01G 4/38* (2006.01)

(52) U.S. Cl.
CPC ............ *H01G 4/228* (2013.01); *H01G 4/005* (2013.01); *H01G 4/224* (2013.01); *H01G 4/38* (2013.01)

(58) Field of Classification Search
CPC ........ H01G 4/228; H01G 4/005; H01G 4/224; H01G 2/10; H01G 4/40
See application file for complete search history.

(56) References Cited

U.S. PATENT DOCUMENTS

| 2013/0222967 A1 | 8/2013 | Imamura et al. | |
| 2018/0233285 A1* | 8/2018 | Sato | H01G 4/18 |
| 2021/0050153 A1* | 2/2021 | Maeno | H01G 4/236 |

FOREIGN PATENT DOCUMENTS

| JP | 2010-251400 A | 11/2010 | |
| JP | 2010-258343 A | 11/2010 | |
| JP | 2018-037433 A | 3/2018 | |
| JP | 2018042309 A * | 3/2018 | |
| WO | WO-2018198527 A1 * | 11/2018 | ............... H01G 2/10 |

* cited by examiner

*Primary Examiner* — David M Sinclair
*Assistant Examiner* — Daniel M Dubuisson
(74) *Attorney, Agent, or Firm* — Oliff PLC

(57) ABSTRACT

A capacitor includes a capacitor element, a pair of bus bars, and an insulating member. The capacitor element includes a positive electrode surface and a negative electrode surface. The pair of bus bars includes a positive electrode bus bar that is connected to the positive electrode surface of the capacitor element and a negative electrode bus bar that is connected to the negative electrode surface, A plate-shaped insulating member is disposed between the positive electrode bus bar and the negative electrode surface. A part of the insulating member is inserted into a bus bar through-hole provided in the positive electrode bus bar.

8 Claims, 7 Drawing Sheets

CAPACITOR

CROSS-REFERENCE TO RELATED APPLICATION

This application is a continuation application of International Application No. PCT/JP2020/036174 filed Sep. 25, 2020 which designated the U.S. and claims priority to Japanese Patent Application No, 2019-181860 filed on Oct. 2, 2019, the contents of each of which are incorporated herein by reference.

BACKGROUND

Technical Field

The present disclosure relates to a capacitor.

Related Art

A capacitor is known, in which a plurality of capacitor elements are arranged in two rows with their negative electrode surfaces facing one another. By arranging a plurality of capacitor elements in this way, the overall thickness of the capacitor can be reduced, and the capacitor can readily be designed to have a low profile.

In the above known capacitor, positive electrode bus bars connected to the positive electrode surfaces of the plurality of capacitor elements are formed such as to pass near the negative electrode surfaces of the plurality of capacitor elements that are disposed facing each other. In the above known capacitor, insulation between the positive electrode bus bar and the negative electrode surfaces is secured by bending the positive electrode bus bar such that the parts of the positive electrode bus bar which pass near the negative electrode surfaces are spaced apart from these surfaces. It is thereby attempted to secure the insulation by providing an insulating space between the positive electrode bus bar and the negative electrode surfaces.

DESCRIPTION OF SPECIFIC EMBODIMENTS

In the above known capacitor, as disclosed in International Publication No. WO 2012/098622 since the parts of the positive electrode bus bars that pass near the negative electrode surfaces are bent such as to provide separation from these surfaces, it is made difficult to reduce the overall height of the capacitor. However due to recent demand for low profile capacitors it is desirable to reduce the profile of a capacitor even by a few millimeters, for example.

It might be envisaged to provide the electrical insulation simply by interposing an insulating member between the positive electrode bus bars and the negative electrode surfaces. In this case, it would not be necessary to bend the positive electrode bus bars such as to separate them from the negative electrode surface and this could facilitate reducing the height of the capacitor. However, it is then necessary to maintain the insulating member positioned between the positive electrode bus bars and the negative electrode surfaces. Unless suitable means are devised, this could increase the size of the capacitor.

In view of the foregoing, it is desired to have a capacitor that can readily be reduced in height.

According to one aspect, the present disclosure provides a capacitor including: a capacitor element with a pair of electrode surfaces; a pair of bus bars connected to respective ones of the pair of electrode surfaces; and a plate-shaped insulating member disposed between a specific one of the bus bars, having one polarity, and the electrode surfaces, which have the other polarity, or between the bus bars. In this capacitor, a part of the insulating member is inserted in a bus bar through-hole provided in the specific bus bar.

In the capacitor of the above aspect, a part of the insulating member s inserted into a bus bar through-hole in a specific bus bar. The insulating member can thereby be positioned with respect to the specific bus bar, with a simplified positioning structure. In addition, it is made possible to position the insulating member while avoiding increasing the size of the capacitor, A capacitor can thus be provided whose height can readily be reduced,

First Embodiment

An embodiment of a capacitor 1 will be described with reference to FIGS. 1 to 7.

Figure 5:
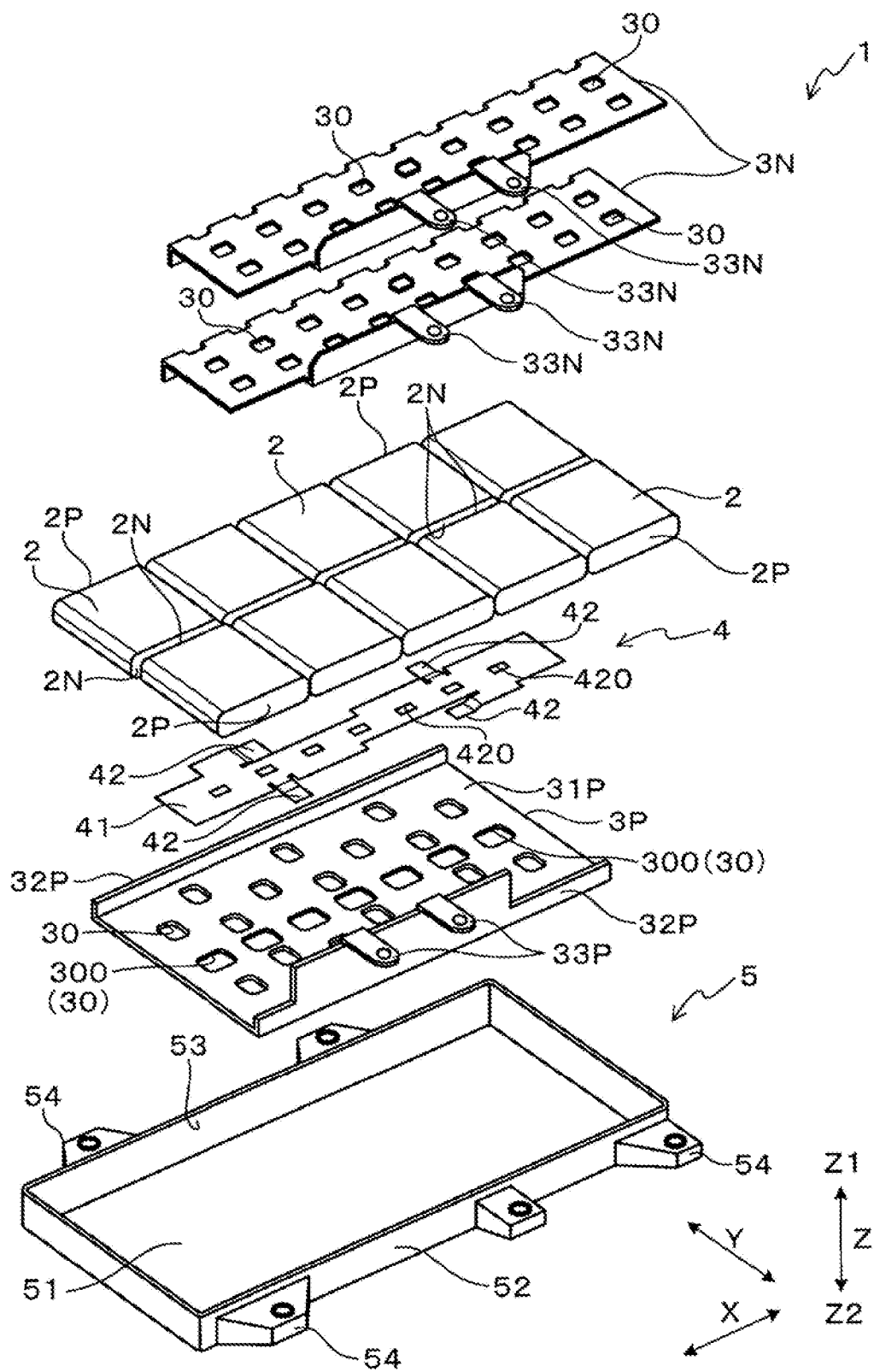
FIG. 5 is an exploded perspective view of the capacitor according to the first embodiment.

As shown in FIG. 5, the capacitor 1 of the present embodiment includes capacitor elements 2, a set of bus bars, and an insulating member 4.

Figure 2:
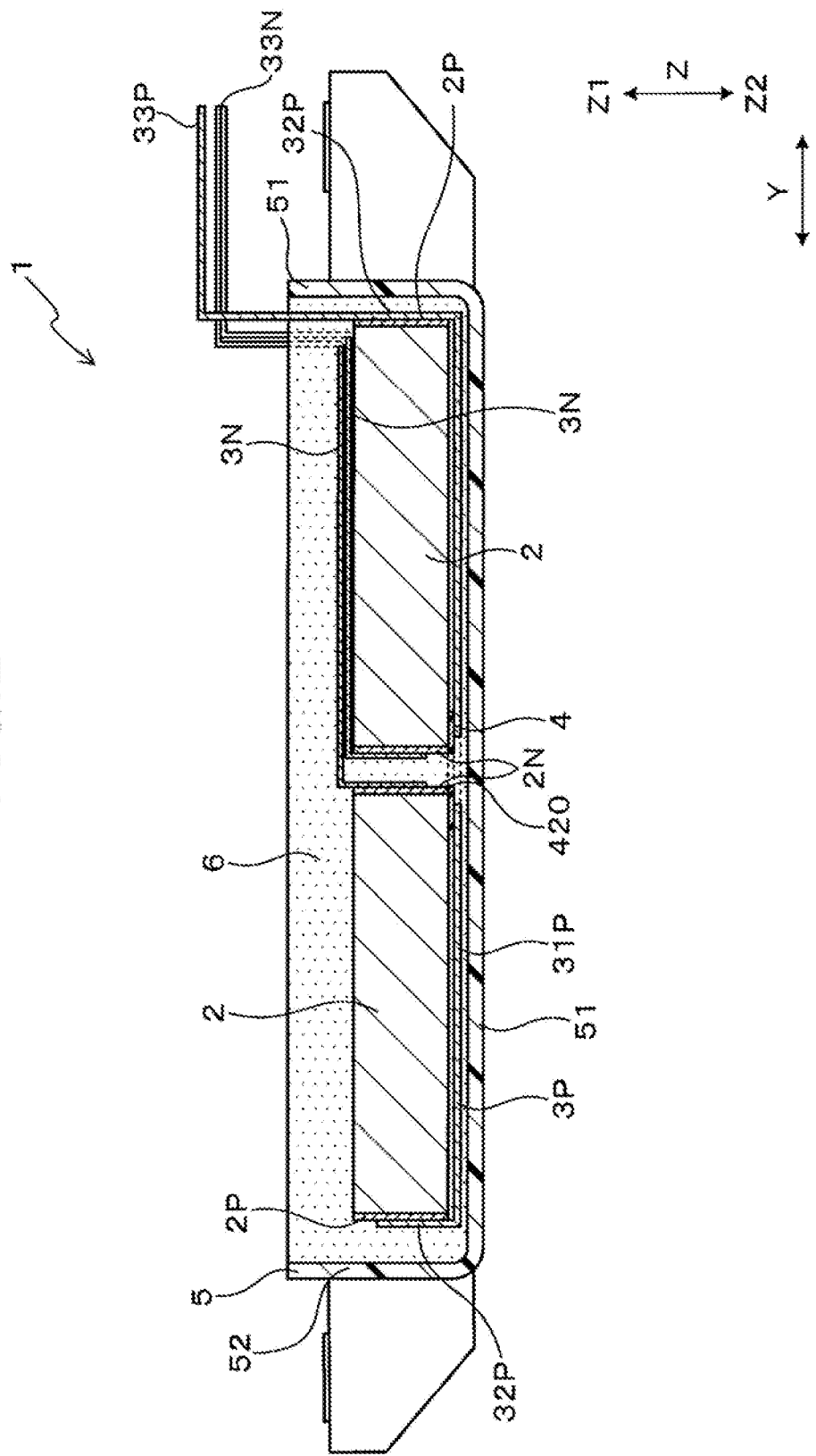
FIG. 2, is a cross-sectional view taken along line II-II of FIG. 1.
Figure 3:
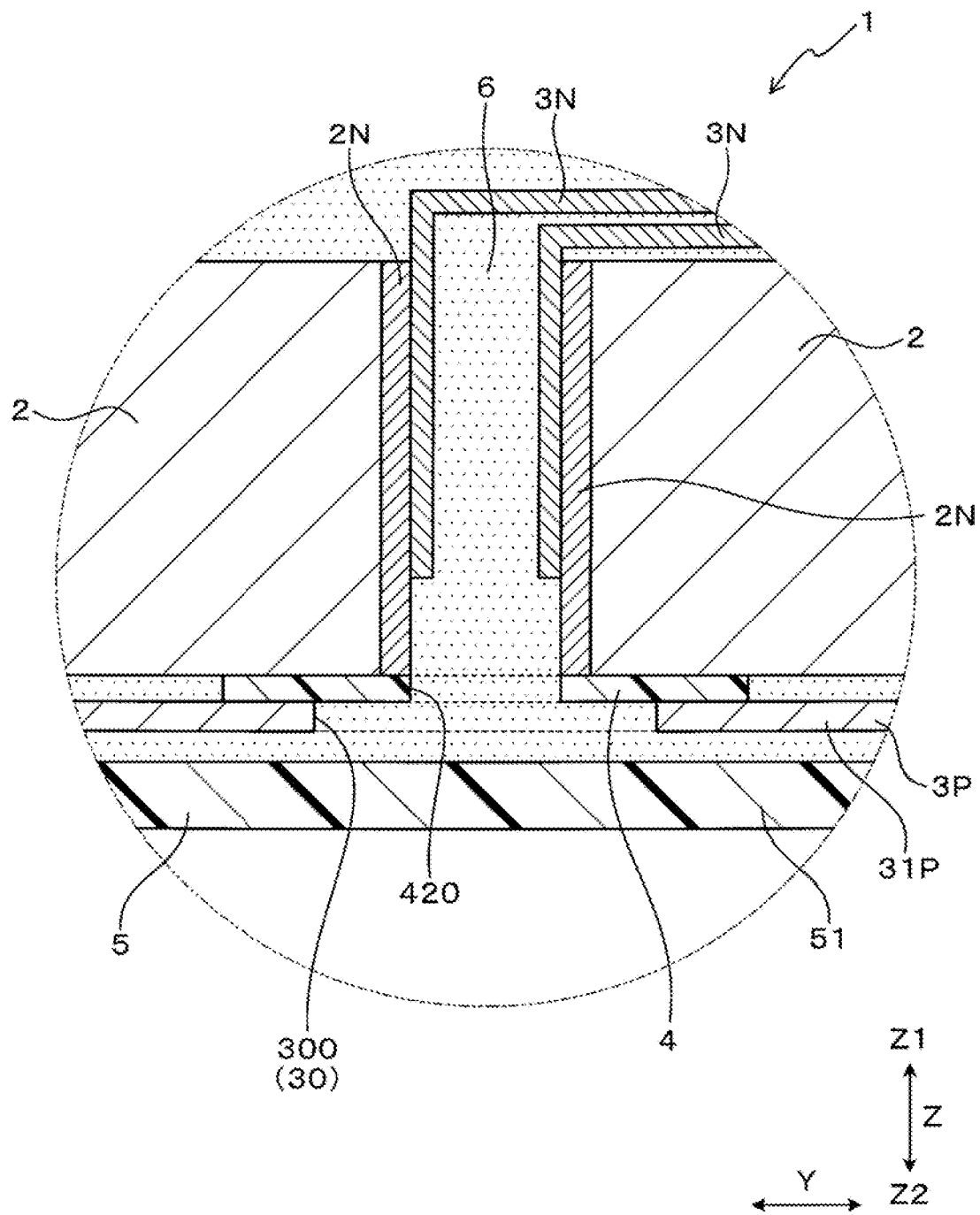
FIG. 3 is an enlarged view of the periphery of an insulating member shown in FIG. 2.
Figure 6:
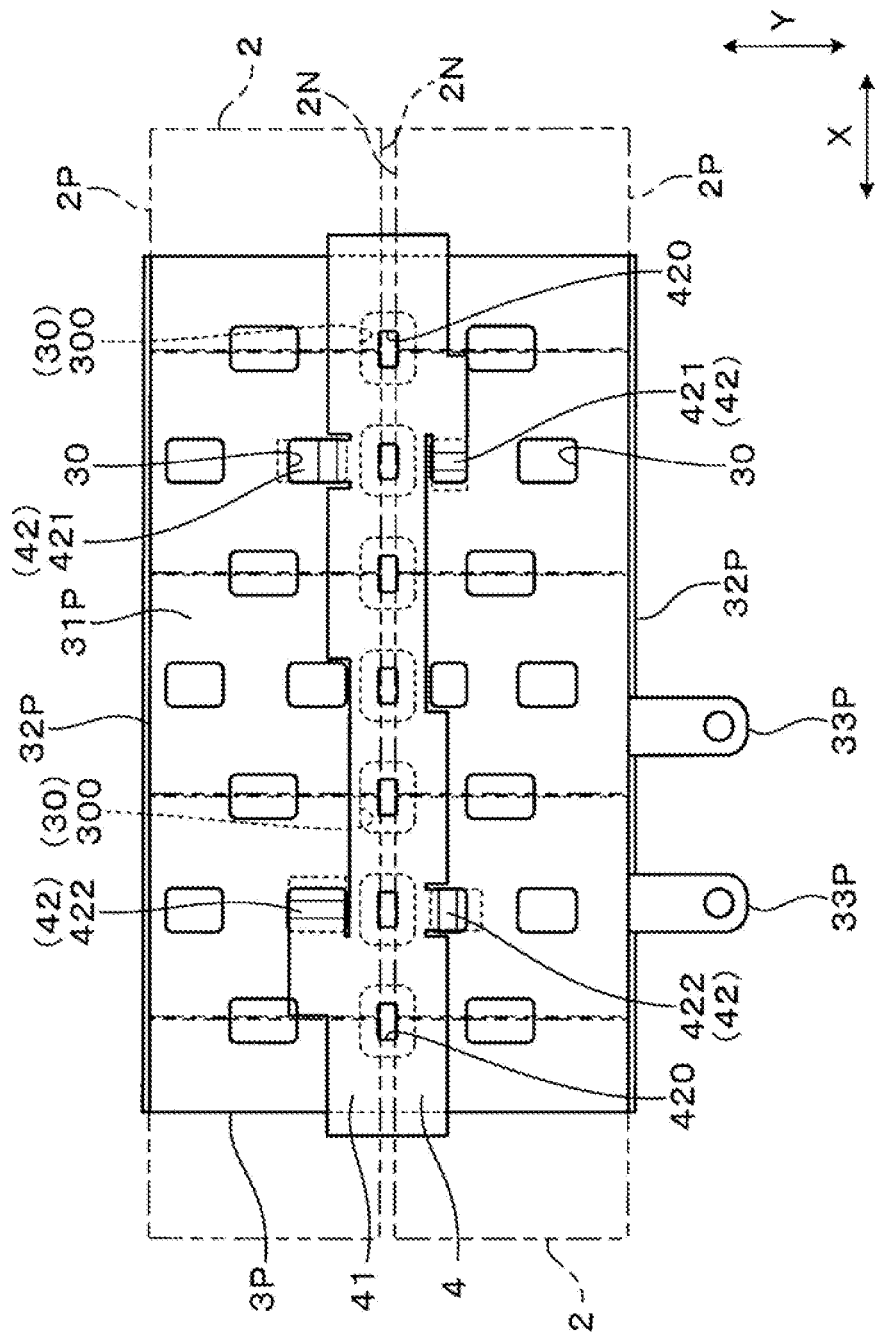
FIG. 6 is a plan view of the positive electrode bus bar and the insulating member in the first embodiment; and FIG, 7 is a schematic cross-sectional view showing how the insulating member is inserted into a through-hole n the positive electrode bus bar, to be positioned with respect to the positive electrode bus bar, with the first embodiment.
Figure 7:
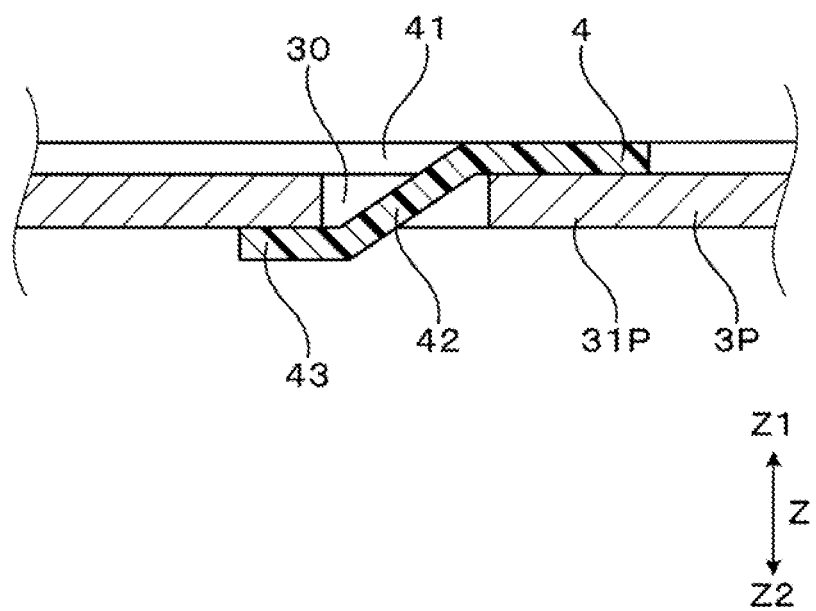

As shown in FIG. 2 the capacitor elements 2 have a pair of electrode surfaces, consisting of a positive electrode surface 2P and a negative electrode surface 2N. The set of bus bars consist of a positive electrode bus bar 3P that is connected to the positive electrode surfaces 2P of the capacitor elements 2 and a pair of negative electrode bus bars 3N that are connected to the negative electrode surfaces 2N. As shown in FIGS. 2, 3 and 6, the insulating member 4 is arranged between the positive electrode bus bar 3P and the negative electrode surfaces 2N, and is plate-shaped. As shown in FIGS. 6 and 7, a part of the insulating member 4 is inserted into bus bar through-holes 30 that are provided in the positive electrode bus bar 3P. The configuration is described in detail in the following.

The capacitor 1 may form, for example, part of a power conversion device. The power conversion device can be an in-vehicle power conversion device mounted on a vehicle such as an electric vehicle or a hybrid vehicle. The power conversion device is connected between a DC power supply (not shown) and a three-phase AC motor. The capacitor 1 smooths the DC voltage applied from the DC power supply side, and outputs the smoothed DC voltage to a switching circuit. The switching circuit converts the DC voltage to an AC voltage, and the power conversion device applies this AC voltage to the three-phase AC motor.

Figure 1:
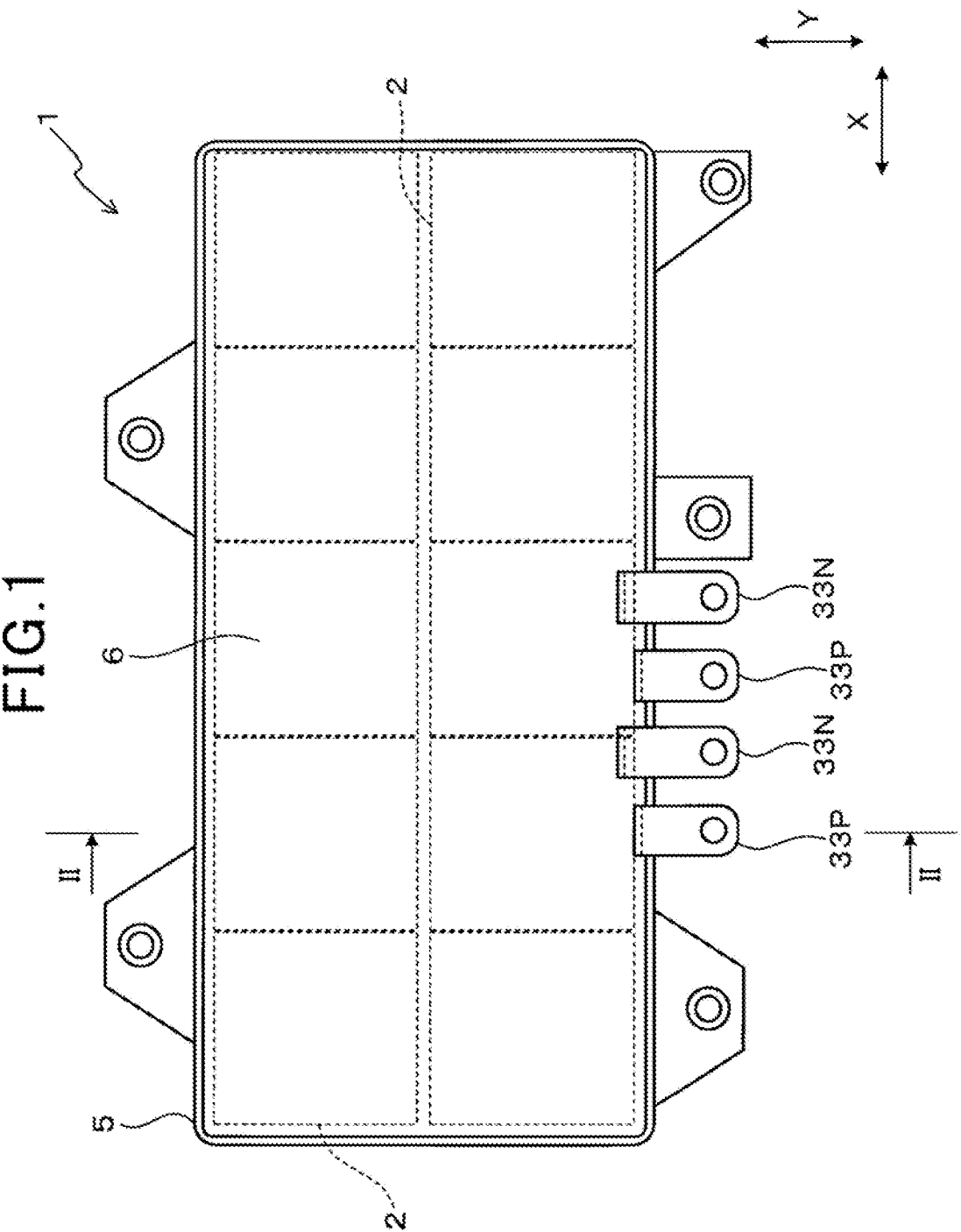
FIG. 1 is a plan view of a capacitor according to a first embodiment.
Figure 4:
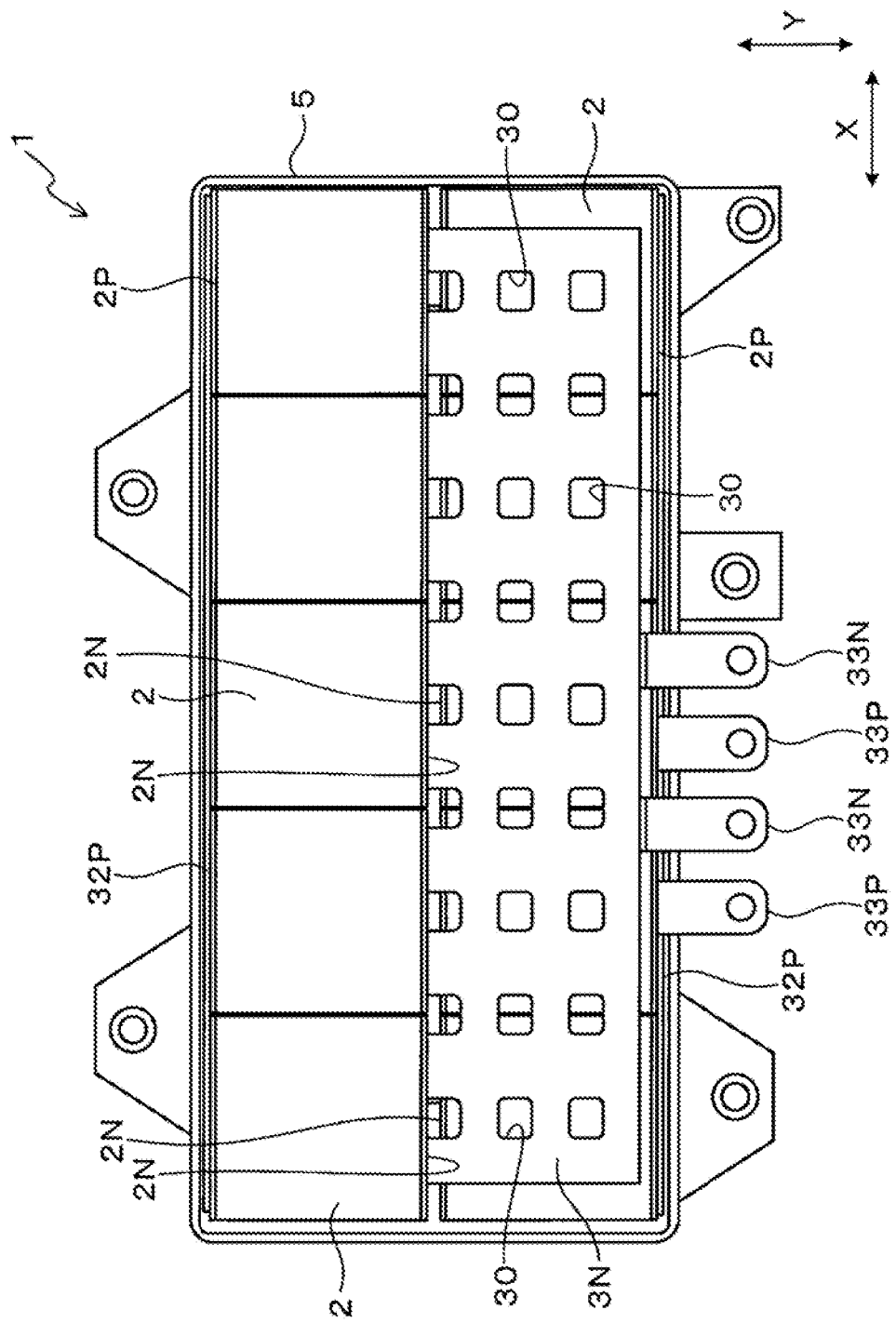
FIG. 4 is a view of FIG. 1 with sealing material omitted.

The capacitor elements 2 can, for example, be film capacitors formed by winding a metallized film, having electrode surfaces formed by metallikon at both ends in the winding axis direction. As shown in FIGS. 1, 4, and 5, the capacitor 1 of the present embodiment is provided with a plurality of capacitor elements 2, The arrangement of the plurality of capacitor elements is devised such as to reduce the overall height of the capacitor 1, i.e., reduce the thickness, In the present embodiment as shown in FIGS. 4 and 5, the plurality of capacitor elements 2 are arranged in two rows along the longitudinal direction of the capacitor 1, with the negative electrode surfaces 2N facing one other in the short direction. Since the capacitor elements 2 tend to be elongated in the direction in which the pairs of electrode surfaces face, such an arrangement enables the height of the capacitor 1 to be reduced. Hereinafter, the thickness direction, the longitudinal direction and the lateral direction of the capacitor 1 are respectively referred to as the Z direction, the X direction, and the Y direction. The X, Y, and Z directions are orthogonal to each other. As shown in FIGS. 1 and 2, the plurality of capacitor elements 2 are housed in the capacitor case 5.

As shown in FIG, 5, the capacitor case 5 is formed in a box shape which opens on one side, in the Z direction. The capacitor case 5 is made for example of an electrically insulating thermoplastic resin. The capacitor case 5 has a bottom wall 51 and side wall 52 erected from the bottom wall 51, with an opening 53 formed by the side wall 52 opposite the bottom wall 51. Hereinafter, the open side of the capacitor case 5 in the Z direction is referred to as the Z1 side, and the opposite side thereof is referred to as the Z2 side.

The bottom wall 1 has a rectangular plate shape with the longitudinal direction in the X direction and the lateral direction in the Y direction. The side wall 52 is erected on the Z1 side from the peripheral edge of the bottom wall 51, and is formed such that the cross-sectional shape orthogonal to the Z direction is rectangular. The side wall 52 is provided with attachment portions 54 which project to the exterior of the capacitor case 5. The attachment portions 54 serve to attach the capacitor case 5 to another member. For example, the capacitor 1 may be bolted at the attachment portions 54 to a device case (not shown) constituting the outer shell of a power conversion device.

The positive electrode bus bar 3P, an insulating member 4, the capacitor elements 2, and negative electrode bus bars 3N are arranged in the capacitor case 5, sealed by a sealing material 6 as shown in FIGS. 1 and 2. The sealing material 6 consists for example of an electrically insulating thermosetting resin. The sealing material 6 is filled in the capacitor case 5 in a fluid condition, at a low temperature, and is then solidified by being heated. The end part of the sealing material 6 on the Z1 side is formed at the same position as the opening 53 of the capacitor case 5. The sealing material 6 seals the plurality of capacitor elements 2, and ensures moisture resistance of each of the capacitor elements 2.

As shown in FIGS. 2 and 5, the positive electrode bus bar 3P has a bus bar bottom surface portion 31P formed along the bottom wall 51 of the capacitor case 5, and a bus bar side surface portion 32P which extends to the Z1 side from the end edges of the bus bar bottom surface portion 31P, with respect to the Y direction. The bus bar bottom surface portions 31P and 32P face the bottom wall 51 and the side wall 52 of the capacitor case 5, respectively.

As shown in FIGS. 5 and 6, the bus bar bottom surface portion 31P has a rectangular plate-shaped form that is elongated in the X direction and short in the Y direction. As shown in FIGS, 2 and 3, the bus bar bottom surface portion 31P faces the bottom wall 51 of the capacitor case 5 and forms a minute gap with the bottom wall 51. The sealing material 6 is also arranged in the minute region that is formed between the bottom surface portion 31P of the positive electrode bus bar 3P and the bottom wall 51.

As shown in FIGS. 5 and 6, a plurality of bus bar through-holes 30 are formed penetrating the bus bar bottom surface portion 31P in the Z direction. The bus bar through-holes 30 serve to pass the sealing material 6 into the capacitor case 5, when the capacitor case 5 is being filled with the sealing material 6 in a condition of fluidity. That is, by forming the bus bar through-holes 30, the sealing material 6 can be readily spread throughout the interior of the capacitor case 5.

As shown in FIG. 6, the plurality of bus bar through-holes 30 include a plurality of central through-holes 300, arrayed along the X direction at a central position with respect to they direction in the bus bar bottom surface portion 31P. The plurality of central through-holes 300 are disposed overlapping, in the Z direction, the spaces in which the capacitor elements 2 face one another in they direction. When filling the capacitor case 5 with sealing material 6 in a state of fluidity, from the opening 53 in the capacitor case 5, the sealing material 6 passes in the direction between the capacitor elements 2, then through the central through-holes 300, and so penetrates between the bus bar bottom surface portion 31P and the capacitor case 5.

As shown in FIGS. 5 and 6, the bus bar side surface portions 32P are formed as a pair which stand upright to the Z1 side, from respective side edges of the bus bar bottom wall 51 with respect to the Y direction. As shown in FIG. 2, each bus bar side surface portion 32P is in close proximity to the side wall 52 of the capacitor case 5. The bus bar side surface portion 32P on one side, with respect to the Y direction, is connected to the respective positive electrode surfaces 2P of the capacitor elements 2 constituting one row of the capacitor elements 2, arranged in the two rows. The bus bar side surface portion 32P on the other side, with respect to the Y direction, connected to the positive electrode surfaces 2P of the capacitor elements 2 that form the other row of the capacitor elements 2.

As shown in FIGS. 5 and 6, the bus bar terminals 33P, for electrically connecting the positive electrode bus bar 3P to the switching element of the switching circuit in the power conversion device, extend from one bus bar side surface portion 32P. As show in FIG. 1, the bus bar terminals 33P are located outside the capacitor case 5, formed such as to project outward from the capacitor case 5 in the Y direction.

As shown n FIGS. 2, 3, 5 to 7, the insulating member 4 is fixed to the Z1 side surface of the bus bar bottom surface portion 31P of the positive electrode bus bar 3P. The insulating member 4 serves to ensure electrical insulation between the negative electrode surfaces 2N of the capacitor elements 2 and the positive electrode bus bar 3P. The insulating member 4 is interposed between the negative electrode surfaces 2N of the two rows of capacitor elements 2 which face one other and the bottom surface portion 31P of the positive electrode bus bar 3P, and secures electrical insulation between them.

As shown in FIG. 6, the insulating member 4 is formed extending in the X direction along the entire length of the bus bar bottom surface portion 31P. In the present embodiment, the length of the insulating member 4 in the X direction is made greater than the length of the bus bar bottom surface portion 31P in the X direction, and the insulating member 4 is arranged such as to project in the X direction on both sides of the bus bar bottom surface portion 31P.

The insulating member 4 is made elastically deformable and plate-shaped, for example. That is, when an external force is applied and the insulating member 4 is deformed from the free state (is bent), then since it is elastically deformable will return to its substantially original state when the external force is released. The insulating member 4 is made of a sheet of PET, for example. Here, the concept of "plate shape" includes the general concept of a shape having a small thickness, such as that of a film or a sheet. The entire insulating member 4 is embedded in the sealing material 6 within the capacitor case 5.

As shown in FIGS. 5 and 6, the insulating member 4 includes a main body portion 41 that is disposed on the Z1 side of the bus bar bottom surface portion 31P of the positive electrode bus bar 3P, and extension portions 42 that extend from the main body portion 41 such as to pass through bus bar through holes 30. As shown in FIG. 7, the end part 43 of each extension portion 42 is disposed to face the Z2 side of the bus bar bottom surface portion 31P of the positive electrode bus bar 3P. As a result, the insulating member 4 is engaged with the bus bar bottom surface portion 31P of the positive electrode bus bar 3P.

Furthermore, the insulating member 4 is restricted from moving to the side at which an extension portion 42 extends with respect to the bus bar bottom surface portion 31P. That is, if the insulating member 4 were to tend to move to the side at which an extension portion 42 extends with respect to the bus bar bottom surface portion 31P (for example, to the left side of the paper surface in FIG. 7), the movement of the insulating member 4 would be restricted, due to interference between the extension portion 42 and the bus bar through-hole 30. As a result, the insulating member 4 is positioned such that it is difficult for it to be moved, with respect to the bus bar bottom surface portion 31P, toward the side to which an extension portion 42 extends.

As shown in FIG. 6, the insulating member 4 has two extension portions 42 (which are also referred to as the pair of extension portions 421 in the following) in a region on one side with respect to the X direction, and another two extension portions 42 (also referred to as a second pair extension portion 422 in the following) on the other side with respect to the X direction, for a total of four extension portions 42.

One of the first pair of extension portions 421 extends to one side in the X direction from the main body portion 41 of the insulating member 4, while the other one of that pair extends to one side in the Y direction from the main body portion 41 of the insulating member 4. As a result, the insulating member 4 is positioned, with respect to the positive electrode bus bar 3P, in both an X direction and a Y direction that are orthogonal to each other in the extending direction of the bus bar bottom surface portion 31P.

Furthermore, one of the second pair of extension portions 421 protrudes to side in the X direction from the main body portion 41 of the insulating member 4, while the other one of that pair protrudes to one side in the Y direction from the main body portion 41 of the insulating member 4. The extension direction of the extension portion 42 that protrudes in the X direction in the first pair of extension portion 421 and the extension direction of the extension portion 42 that protrudes in the X direction in the second pair of extension portions 422 are opposite to each other, and in this embodiment these extension portions 42 face each other. Furthermore, the extension direction of the extension portion 42 that protrudes in the Y directions in the first pair extension portion 421 and the extension direction of the extension portion 42 that protrudes in the Y direction in the second pair of extension portions 422 are opposite to each other, and in this embodiment these extension portions 42 face away from each other. As a result, the insulating member 4 is more firmly positioned with respect to the positive electrode bus bar 3P in both the X direction and the Y direction.

As shown in FIG. 6, the insulating member 4 is arranged on the Z1 side surface of the bus bar bottom surface portion 31P such as to cover all of the central through-holes 300 of the bus bar bottom surface portion 31P, from the Z1 side. The insulating member 4 is formed with insulating through-holes 420 which are formed at positions such as to be overlapped by the central through-holes 300, with respect to the Z direction. As a result, the insulating through-holes 420 are located in regions between the plurality of capacitor elements 2, as viewed from the Z direction, which is the opening direction of the capacitor case 5. Hence, when the capacitor case 5 is filled with the sealing material 6 in a condition of fluidity, the sealing material 6 passes through the insulating through-holes 420 and the central through-holes 300, and can then penetrate between the bottom wall portion 31P of the positive electrode bus bar 3P and the bottom wall 51 of the capacitor case 5.

A plurality of the insulating through-holes 420 are formed, aligned in a row along the X direction. The insulating through-holes 420 are formed such as to be smaller than the central through-holes 300 in the bus bar through-holes 30, which overlap them in the Z direction, and are accommodated within the peripheries of these bus bar through-holes 30. As a result, creepage distance is secured between the negative electrode surfaces 2N of the capacitor elements 2 and the bus bar bottom surface portion 31P of the positive electrode bus bar 3P, and electrical insulation between them is secured.

As shown in FIGS. 2 to 4, a negative electrode bus bar 3N is connected to the negative electrode surface 2N of each capacitor element 2. In this embodiment there are two negative electrode bus bars 3N, i.e., a negative electrode bus bar 3N which is connected to each negative electrode surface 2N of the capacitor elements 2 in one of the two rows of capacitor elements 2, and a negative electrode bus bar 3N which is connected to each negative electrode surface 2N of the capacitor elements 2 in the other row of capacitor elements 2.

The two negative electrode bus bars 3N are arranged such as to overlap each other in the Z direction at positions on the Z1 side of one of the rows of capacitor elements. As shown in FIGS. 4 and 5, a plurality of bus bar through-holes 30 penetrating in the Z direction are also formed in the negative electrode bus bars 3N. As shown in FIG. 4, a part of the plurality of bus bar through-holes 30 are formed at positions which overlap, in the Z direction, with the regions between the capacitor elements 2 that face one another in the Y direction. In that way, penetration of the sealant 6 into these regions is made less likely to be obstructed.

On the opposite side of each negative electrode bus bar 3N from the side connected to the capacitor elements 2, bus bar terminals 33N are formed for electrically connecting the negative electrode bus bar 3N to the switching elements. As shown in FIGS. 1, 2, and 4, the bus bar terminals 33N are disposed outside the capacitor case 5 and are formed extending outward from the capacitor case 5 in the Y direction. Each negative electrode bus bar 3N has two bus bar terminals 33N, and the bus bar terminals 33N of the respective negative electrode bus bars 3N are arranged such as to overlap one other in the Z direction.

The effects obtained with this embodiment are as follows.

In the capacitor 1 of the present embodiment, parts of the insulating member 4 are inserted into the bus bar through-holes 30 provided in the positive electrode bus bar 3P. By thus inserting parts of the insulating member 4 into the s bar through-holes 30, the insulating member 4 can be positioned relative to the positive electrode bus bar 3P with a simplified positioning structure. Furthermore, this positioning of the insulating member 4 can be achieved while avoiding an increase in the size of the capacitor 1.

When ensuring electrical insulation between components in the capacitor case 5 by disposing an insulating member 4 in the capacitor case 5, fixedly positioning the insulating member 4 within the capacitor case 5 presents a technically difficult point. If the insulating member 4 becomes misaligned in the capacitor case 5, it is possible that the desired electrical insulation cannot be ensured. In this respect, it would be possible to simply attach the insulating member 4 in the capacitor case 5 by using an adhesive material, or a double-sided adhesive tape. However, in that case the issues arise that another element (member) will be required, while also the adhesive material or double-sided adhesive tape must be selected taking into consideration reactivity with the sealing material 6 that will be filled in the capacitor case 5, and that the thickness of the capacitor 1 as a whole will tend to be increased.

However, by positioning the insulating member 4 with respect to the positive electrode bus bar 3P by inserting portions of the insulating member 4 in the bus bar through-holes 30 of the positive electrode bus bar 3P, as with the present embodiment it is made unnecessary to use a separate element (member) for this purpose, and it is also made unnecessary to consider reactivity with the sealing material 6, while also an increase in thickness can be avoided.

Furthermore, the insulating member 4 includes a main body portion 41 disposed on one side of the positive electrode bus bar 3P, and an extension portion 42 extending from the main body portion 41 such as to pass through a bus bar through-hole 30, with a part of the extension portion 42 disposed facing the other side of the positive electrode bus bar 3P. As a result, the insulating member 4 is positioned in both of the Z directions with respect to the positive electrode bus bar 3P. It is thus easy to prevent the insulating member 4 from being displaced from the positive electrode bus bar 3P.

Moreover, the insulating member 4 is positioned relative to the positive electrode bus bar 3P in both the X and Y directions, which are vertical and lateral directions that are orthogonal to one another other and are extending directions of the surface of the positive electrode bus bar 3P on which the insulating member 4 is arranged. It is thereby made possible to prevent the insulating member 4 from being displaced with respect to the positive electrode bus bar 3P in a direction orthogonal to the Z direction.

Furthermore, the capacitor case 5 is filled with a sealing material 6 for sealing the capacitor elements 2, and the insulating member 4 is located on the Z1 side of the positive electrode bus bar 3P, which is the side to which the capacitor case 5 opens. It is thereby made easy to prevent the insulating member 4 from becoming displaced from the positive electrode bus bar 3P. In this respect, if the insulating member 4 were to be arranged on the Z2 side of the positive electrode bus bar 3P there is a danger that the insulating member 4 would be pushed away from the positive electrode bus bar 3P by the sealing material 6 when it flows intra the capacitor case 5, and so might become displaced from the positive electrode bus bar 3P. However if the insulating member 4 is arranged with respect to the positive electrode bus bar 3P on the side to which the capacitor case 5 opens (i.e., the Z1 side), as with the present embodiment, then when the liquid sealing material 6 is filled in the capacitor case 5 in a condition of fluidity, the insulating member 4 will be pressed against the positive electrode bus bar 3P by the sealing material 6 as it flows into the capacitor case 5, thereby eliminating the danger that the insulating member 4 will become displaced.

Furthermore, the plurality of capacitor elements 2 are arranged in a plurality of rows along an arrangement direction (X direction) that is orthogonal to the direction (Y direction) in which the negative electrode surfaces 2N face one another. As a result, the overall height of the capacitor 1 can be reduced. On the other hand, the negative electrode surfaces 2N and the positive electrode bus bar 3P are close to one other, and it is necessary to secure electrical insulation between them. However, by arranging the insulating member 4 between the positive electrode bus bar 3P and the negative electrode surfaces 2N that face one other in the plurality of capacitor elements 2, electrical insulation in the capacitor 1 can be ensured while also reducing the height of the capacitor.

Furthermore, the insulating member 4 is formed in its alignment direction (X direction) over the entire length of the surface portion of the positive electrode bus bar 3P where the insulating member 4 is arranged. This facilitates securing electrical insulation between the positive electrode bus bar 3P and the negative electrode surfaces 2N.

Moreover the insulating member 4 has insulating through-holes 420 that open toward the bus bar through-holes 30 of the positive electrode bus bar 3P. The sealing material 6 that flows into the capacitor case 5 can thereby readily penetrate around the entire interior of the capacitor case 5, by passing through the insulating through-holes 420.

Furthermore, the insulating through-holes 420 are located in the region between the plurality of capacitor elements 2 when viewed from the opening direction (Z direction) of the capacitor case 5. Since the region between the capacitor elements 2 is a region through which the sealing material 6 should passes as it flows into the capacitor case 5, by arranging the insulating through-hole 420 in such a region it is possible to prevent obstruction of the penetration of the sealing material 6 into the capacitor case 5 and the sealing material 6 can thereby penetrate to the entire interior of the capacitor case 5.

With the present embodiment, as described above, it is possible to provide a capacitor that can be easily reduced in height.

The present disclosure is not limited to the above embodiment, and can be applied to various embodiments without departing from the gist thereof. For example, in the above-described embodiment, an example is shown in which a part of the insulating member is inserted into a bus bar through-hole provided in the positive electrode bus bar to secure electrical insulation between the positive electrode bus bar and the negative electrode surfaces of the capacitor elements. However, the disclosure is not limited to this. For example, a part of the insulating member may be inserted into a bus bar through-hole provided in a negative electrode bus bar to ensure electrical insulation between the negative electrode bus bar and the positive electrode bus bar or between a negative electrode bus bar and a positive electrode surface. Furthermore, for example, the insulating member may be positioned with respect to a bus bar by forming a part of the insulating member with an extension portion that projects in a columnar shape, and press-fitting the extension portion into a bus bar through-hole.

The present disclosure is described in compliance with the embodiments. However, it should be appreciated that the present disclosure is not limited to the embodiments or the structures thereof. The present disclosure encompasses various modified examples and modifications within the range of equivalency. In addition, the scope of the present disclosure and the range of ideas thereof include various combinations and forms and other combinations and forms additionally including one or more elements or a portion of one element.

What is claimed:

1. A capacitor comprising:
a capacitor element having a pair of electrode surfaces;
a pair of bus bars connected to respective ones of the pair of electrode surfaces; and
a plate-shaped insulating member disposed between a specific one of the bus bars having one polarity and an electrode surface having the other polarity, or between the bus bars,
wherein a part of the insulating member is inserted in a bus bar through-hole provided in the specific bus bar,
the insulating member includes a main body portion and at least one extension portion that extends from the main body portion such as to pass through the bus bar through-hole, and
the at least one extension portion includes a first extension portion in a vertical direction and a second extension portion in a horizontal direction, the vertical direction and the horizontal direction being orthogonal to one other and being extending directions of the surface portion of the specific bus bar on which the insulating member is disposed.

2. The capacitor according to claim 1, wherein
the main body portion is disposed on one side of the specific bus bar, and
a part of each of the at least one extension portion is disposed such as to face the other side of the specific bus bar.

3. The capacitor according to claim 1, wherein
the insulating member is positioned, with respect to the specific bus bar, in both the vertical direction and the horizontal direction.

4. The capacitor according to claim 1, further comprising a capacitor case which houses the capacitor element and has an opening,
wherein the capacitor case is filled with a sealing material for sealing the capacitor element, and
the insulating member is disposed, with respect to the specific bus bar, on the side to which the capacitor case opens.

5. The capacitor according to claim 1, further comprising a plurality of the capacitor elements,
wherein the plurality of capacitor elements are arranged in a plurality of rows along an alignment direction that is orthogonal to a direction in which respective ones of the electrode surfaces having the same polarity face one another, and
the insulating member is arranged between the electrode surfaces of the plurality of capacitor elements that face one another and the specific bus bar having a polarity opposite to the polarity of the electrode surfaces.

6. The capacitor according to claim 5, wherein
the insulating member is formed over the entire arrangement direction on the surface portion of the specific bus bar where the insulating member is arranged.

7. The capacitor according to claim 1, further comprising a capacitor case which houses the capacitor element and has an opening,
wherein the capacitor case is filled with a sealing material for sealing the capacitor element, and
the insulating member has an insulating through-hole that opens toward a bus bar through-hole of the specific bus bar.

8. The capacitor according to claim 7, wherein
the insulating through-hole is located in a region between a plurality of the capacitor elements, as viewed from the opening direction of the capacitor case.

* * * * *